(12) United States Patent
Chuang

(10) Patent No.: US 7,382,554 B1
(45) Date of Patent: Jun. 3, 2008

(54) OPTICAL SPACER WITH EXTENDABLE TRAVELLING LENGTH OF IMAGES FOR CAMERA SYSTEM

(76) Inventor: Jeff C. P. Chuang, 235 Chung-Ho, Box 8-24, Taipei (TW)

( * ) Notice: Subject to any disclaimer, the term of this patent is extended or adjusted under 35 U.S.C. 154(b) by 0 days.

(21) Appl. No.: 11/710,058

(22) Filed: Feb. 23, 2007

(51) Int. Cl.
*G02B 15/14* (2006.01)
*G02B 7/02* (2006.01)
*G02B 15/06* (2006.01)

(52) U.S. Cl. .................. 359/704; 359/823; 396/200
(58) Field of Classification Search .......... 359/694, 359/696, 699, 700, 701, 703, 1, 819, 823; 396/72, 79, 85, 87, 349, 448, 80, 106
See application file for complete search history.

(56) References Cited

U.S. PATENT DOCUMENTS 4,023,189 A * 5/1977 Govignon .............. 396/18
6,026,245 A * 2/2000 Fujii et al. .............. 396/85

* cited by examiner

*Primary Examiner*—M. Hasan

(57) ABSTRACT

A spacer for extending an image from a lens assembly of a camera comprises a hollow tube having a front engaging portion capable of being connected to the lens assembly and a rear engaging portion capable of being connected to the camera body; and a first lens installed in the tube; and a second lens installed in the tube and being spaced apart from the first lens. The tube is telescopic. This is achieved by causing that the tube has a plurality of sections or the tube has at least two sections which are threaddedly engaged or a compressible and expandable snake like structure is installed between two sections of the tube so that the tube can be prolonged or compressed to adjust the whole length of the spacer. Furthermore the first lens and second lens are concave lenses or convex lenses which are symmetric or asymmetric.

9 Claims, 10 Drawing Sheets

OPTICAL SPACER WITH EXTENDABLE TRAVELLING LENGTH OF IMAGES FOR CAMERA SYSTEM

FIELD OF THE INVENTION

The present invention relates to camera parts, and particularly to an optical spacer for extending an image traveling distance from a lens assembly to an image sensor of a camera.

BACKGROUND OF THE INVENTION

A typical schematic view of a conventional camera is showing in FIG. 1. The conventional camera structure includes a lens device 10 and a camera body 20 enclosing a circuit board 21, an image sensor 22 and a receptacle portion 23 for containing the sensor 22. In this conventional configuration, the lens device 10 includes a lens tube 11 with at least one piece of lens 12 inside the lens tube 11, and the sensor 22 is mounted on the circuit board 21. At an distal end of the lens tube 11, the tube is connected with the camera body 20, and the distance between the lens 12 and the sensor 22 is in close proximity.

According to the general optical imaging theory, a reflected light from an object captured by the lens device can be focused onto an optical sensor 22, by a plurality of lenses inside the lens tube 11. An optical sensitive sensor 22 can convert the focused lights into electrical currents. As the electrical current flowing into the semiconductor devices on the circuit board 21 through electrically wired connections, the electrical signals are post-processed and converted into digital data for displaying the reconstructed image on electronic display devices or storing into memory devices.

In the prior art the shape of the lens device 10 is configured as a small circular ring as illustrated in FIG. 1, meanwhile the camera body 20 is constructed in a cubic like shape to accommodate circuit board and electronic devices. In this configuration, the lens set 10 is attached to the camera body 20 and the lenses are designed to be very close to the sensor 22 for a compact camera body design and maintaining good quality of image. The camera systems have been used in many applications in our daily life, however there are cases requiring the lenses device 10 far away from the camera body 20 due to various design constraints in space. Most of the current used and produced cameras provide lens devices with short lengths neither be able to match the design constraints nor be able to meet the required product specifications. As a result, there are demands for novel designs to overcome the design constraints to extend the image traveling length.

The various objects and advantages of the present invention would be more obviously understood as we disclose the detailed description in conjunction with the appended figures.

SUMMARY OF THE INVENTION

Accordingly, the primary object of the present invention is to provide a spacer for extending an image from a lens assembly of a camera. The spacer is installed between the lens assembly having at least one lens therein for capturing an image and a camera body having an image sensor for converting the incident light into electrical signals.

To achieve above objects, a spacer is provided to be implemented between the lens assembly and sensor for extending the image of a camera. The spacer installed between the lens assembly and sensor will have at least one lens therein for capturing an image. The spacer comprises a hollow tube having a front engaging portion capable of being connected to the lens assembly and a rear-engaging portion capable of being connected to the camera body. A first lens and a second lens are installed within the spacer tube and separated from each other with a designed space in between. An axis of the first lens and an axis of the second lens are arranged approximately in parallel and are approximately vertical to an axis of the tube. The tube is telescopic. This is achieved by causing that the tube has a plurality of sections or the tube has at least two sections which are engaged by thread or a compressible and expandable snake like structure installed between two sections of the tube so that the tube can be prolonged or compressed to adjust the whole length of the spacer of the present invention. The first lens and second lens are concave lenses and may be symmetric or asymmetric or the first lens and second lens are concave lenses with symmetric or non-symmetric in arrangement.

Finally, in the present invention, a retaining unit is installed within the spacer tube. An optical filter glass is installed in the tube for filtering out of a predetermined light spectrum and can be positioned selected locations such as in front of the first lens, between the two lenses or behind the second lens.

DETAILED DESCRIPTION OF THE INVENTION

In order to assist those skilled in the art realizing the present invention, the detailed description of the invention is disclosed in this section. However, the descriptions and the appended drawings are only used to cause those skilled in the art to understand the objects, features, and characteristics of the present invention, but not to be used to confine the scope and spirit of the present invention defined in the appended claims.

Figure 1:
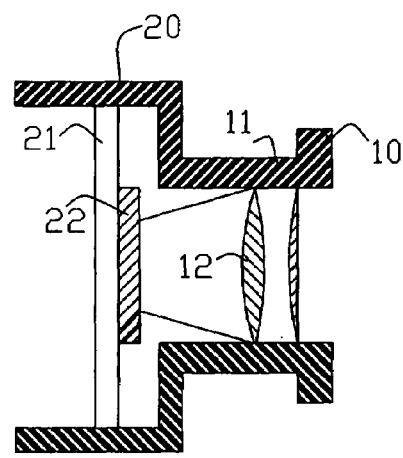
FIG. 1 shows a prior art camera structure including the lens assembly and a camera body.
Figure 2A:
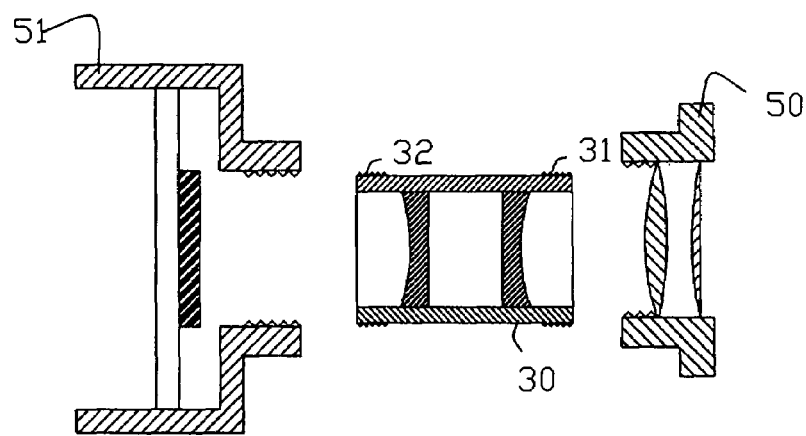
FIG. 2 shows the spacer implemented between the lens assemble and a camera body according to first embodiment of the present invention.
Figure 2B:
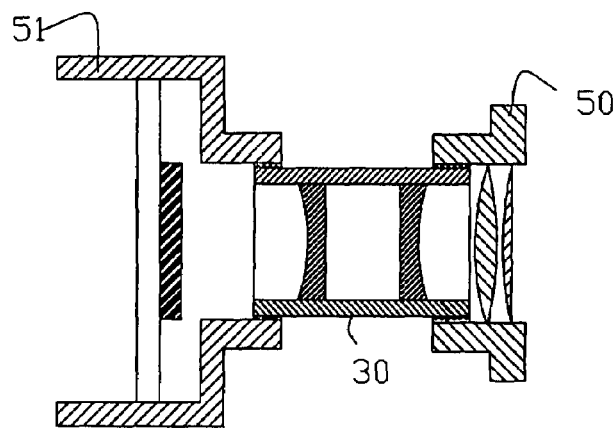

Referring to FIG. 2, the first embodiment about the spacer of the present invention is illustrated. The spacer of the present invention is in a hollow tube 30 with two lenses, a first lens 41 and a second lens 42, installed therein. Generally, the tube 30 is a cylindrical rigid structure. The tube 30 has a front engaging portion 31 and a rear-engaging portion 32. The front engaging portion 31 serves as for connecting to a lens assembly 50 by for example, threads, or buckling. The rear-engaging portion 32 serves as for connecting to a camera body 51 by for example, threads or buckling. In FIG. 2, the front-engaging portion 31 and rear-engaging portion 32 are illustrated by threaded portions, however these are not used to confine the scope of the present invention, other structures having the functions of engaging two different portions are also within the scope and spirit of the present invention.

Figure 3A:
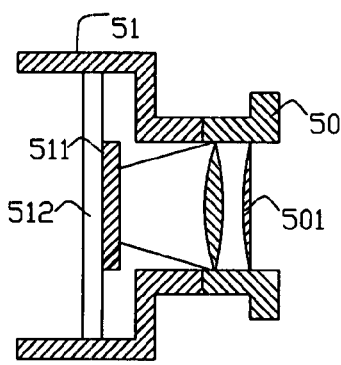
FIGS. 3(A), 3(B) and 3(C) are schematic views for explaining the physical mechanisms of the present invention.
Figure 3B:
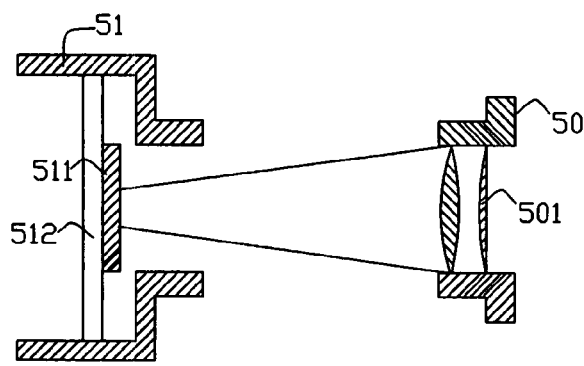
Figure 3C:
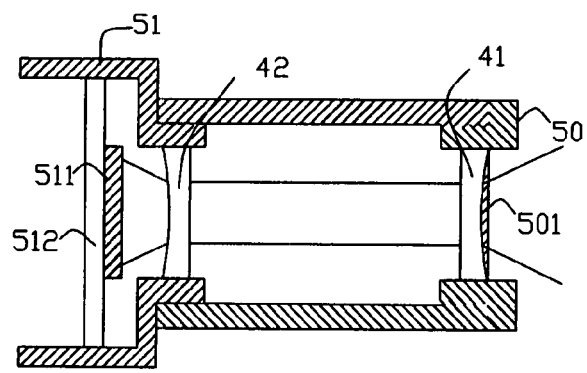

The first lens 41 and the second lens 42 are spaced apart with a distance d. In the embodiment, the first lens 41 and the second lens 42 are all concave lenses with a flat surface at one side facing to another lens. Referring to FIGS. 3(A), 3(B) and 3(C), the physical mechanism is illustrated for the description of the present invention. Firstly, an image is captured by the lens assembly 50 with lens set 501 therein and thus the image converges and then is focused at the backside of the lens assembly 50. In the prior art, the image will incident into an image sensor 511 (such as a charge coupling device (CCD) or a CMOS arrays) on a circuit board 512 of the camera body 51, referring to FIG. 3(A). If the lens assembly 50 is shifted to a farther place as illustrated in FIG. 3(B), the image can be focused to the image sensor 511 so that the image will disperse and the image sensor 511 only captures a blurred image. However if we add lenses into the tube 30, as illustrated in FIG. 3(C), the originally converging image will pass through the first lens 41 and then will be expanded to become parallel light beam to be transferred through the distance d. As the parallel light beam passes through the second lens 42 and then is further expanded by the second lens 42 so that the second lens 42 will enlarge the image. Finally, the second lens 42 will incident into the image sensor 511. As a result, the image projected into the image sensor 511 will have a desired coverage without reduction. Thus from above description, it is known that by adding the present invention in between the camera body 51 and the lens assembly 50, the image can be retained with a large coverage on the image sensor.

Those skilled in the art should understand that above mentioned structure is only an ideal case for illustrating the use of the spacer of the present invention, while in the present invention, the distance of the two lenses is not confined. Moreover, the curvatures of the first lens 41 and second lens 42 are not confined to have a perfect form which can retain the image to have a parallel beams. However the output light beam out of the first lens 41 may be not a parallel beam if the curvature of the first lens 41 is not an ideal one. Although this will make the image quality not as good as compare to the performance of the former example, all these non-ideal cases are also within the scope and spirit of the present invention.

Figure 4:
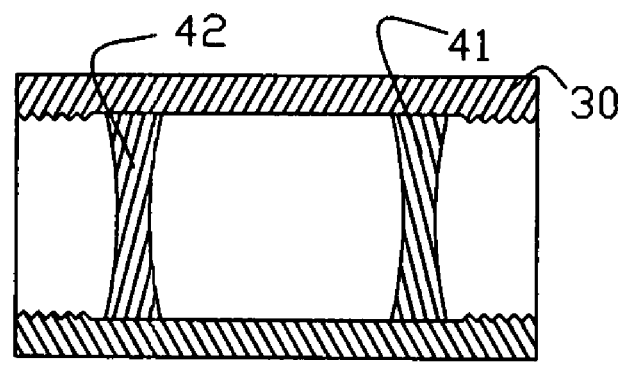
FIG. 4 is a schematic view of two double-face concave lenses inside the spacer according to the present invention.
Figure 4A:
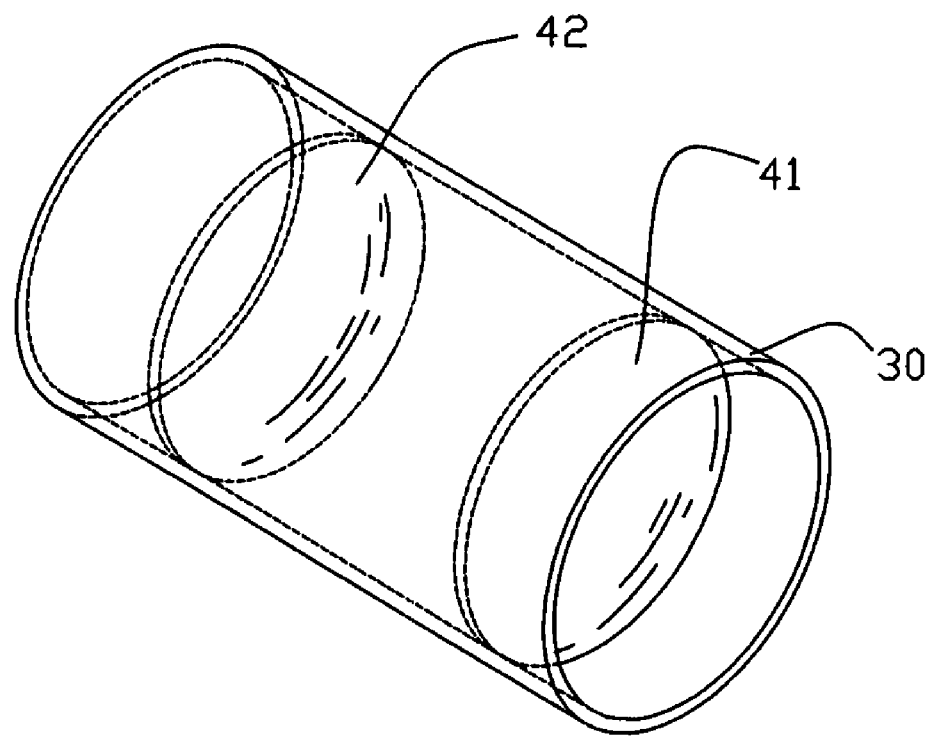
FIG. 4(A) is a perspective view about the spacer in FIG. 4.

Referring to FIG. 4, it shows that in the present invention, each of the two lenses, the first lens 41 and second lens 42, is a double face concave lens. Although these lenses cannot form a parallel beam there between, this example is still within the scope of the present invention.

Figure 5A:
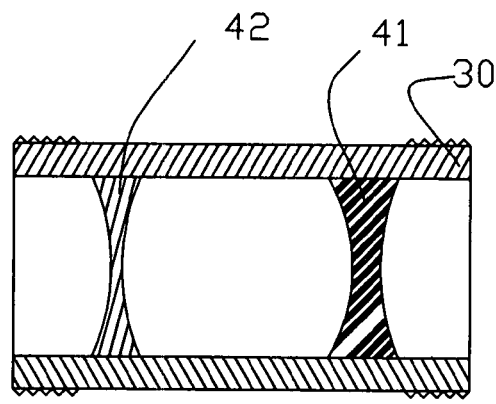
FIGS. 5(A) and 5(B) are schematic views showing some various designs of the first embodiment of the present invention.
Figure 5B:
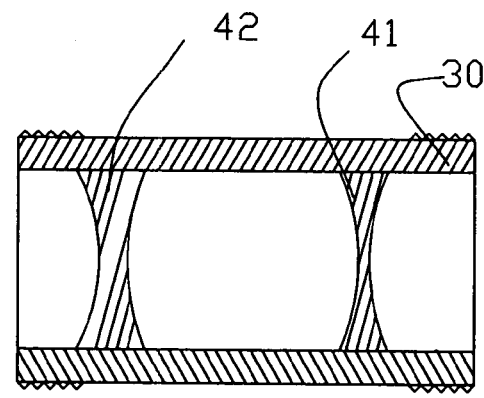

Moreover, referring to FIGS. 5(A) and 5(B), in the present invention, the two concave lenses are not limited to be symmetrical in arrangement, as illustrated in the drawings, in FIG. 5(A), the two concave lenses, the first lens 41 and second lens 42 are asymmetrical. The curvature of the first lens 41 is greater than that of the second lens 42. In FIG. 5(B), the curvature of the second lens 42 is greater than that of the first lens 41.

Figure 6:
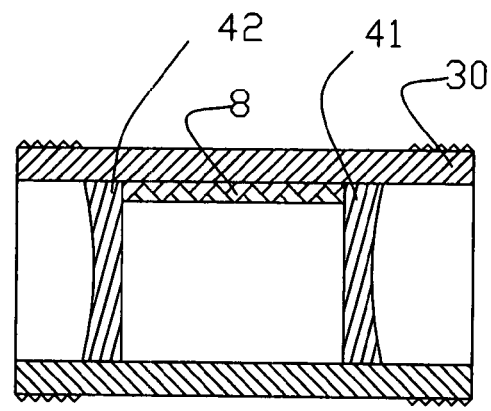
FIG. 6 shows that in one application of the present invention, a retaining unit is installed in the tube and between two lenses.

Referring to FIG. 6, another variation of the present invention is illustrated. It is illustrated that in the present invention, a retaining unit 8 is installed between two the first lens 41 and second lens 42 so as to retain the two lenses 41, 42 within a fixed distance. The retaining unit can be a partial or a whole round between the two lenses.

Figure 7A:
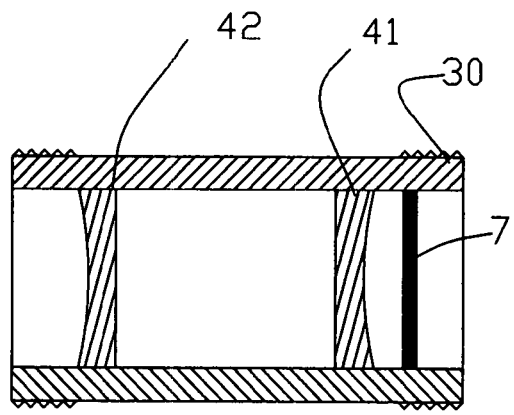
FIGS. 7(A) to 7(C) shows that an optical filter glass installed at different positions within the tube of the present invention.
Figure 7B:
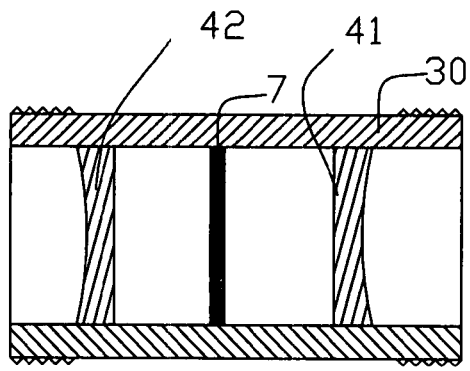
Figure 7C:
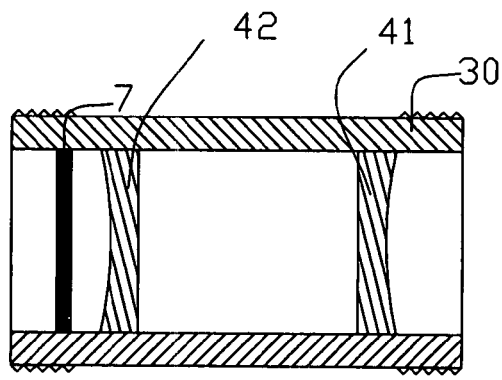

Referring to FIGS. 7(A), 7(B) and 7(C), another variation of the present invention is illustrated. It is illustrated that a optical filter glass 7 is installed within the tube 30 for filtering out undesirable section of light spectrum to maintain an image with preferred quality. The filter 7 can be installed at different positions of the tube. In FIG. 7(A), it is showing that the optical filter glass 7 is installed between the lens assembly and the first lens 41. In FIG. 7(B), it is illustrated that the optical filter glass 7 is installed between the first lens 41 and the second lens 42. In FIG. 7(C), it is illustrated that the optical filter glass 7 is installed behind the second lens 42. Conventionally, the optical filter glass 7 is added on a front surface of the first lens 41, the coating layer of the filter is exposed to outside and its surface is prone to various damages due to careless handling by users. If the filer glass 7 of the present invention is located behind the first lens 41, above-mentioned problems can be avoided.

Figure 8A:
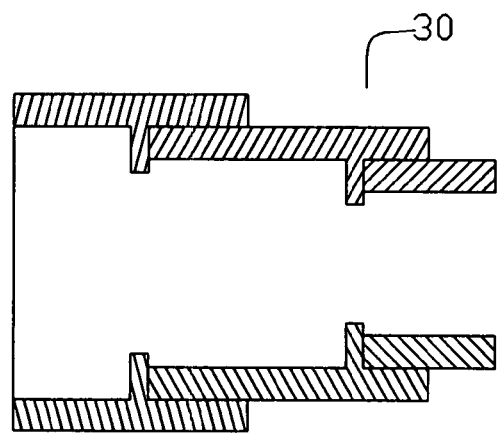
FIGS. 8(A) to 8(C) show a variety of designs of the first embodiment of the present invention, wherein the tube of the present invention is telescopic.
Figure 8B:
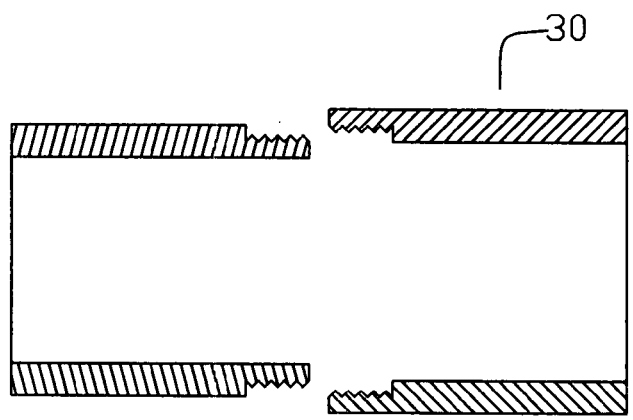
Figure 8C:
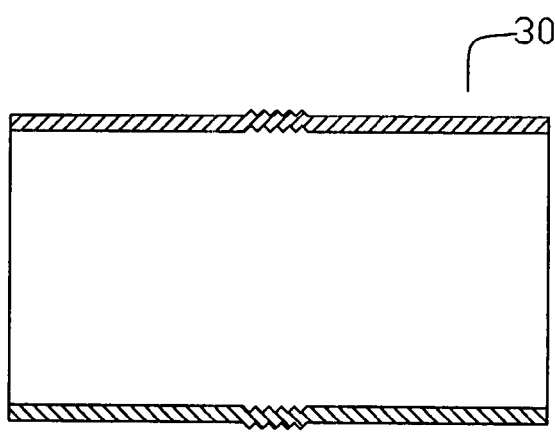

Referring to FIGS. 8(A) to 8(C), some variations about the first embodiment of the present invention are illustrated. In this embodiment, those identical to the above embodiment will not be further described herein. Only those different from above embodiment are described. In this second embodiment, it is illustrated that the tube 30 is a telescopic tube. There are many different forms that can achieve above-mentioned object. In FIG. 8(A), it is shown that the tube 30 has a plurality of sections, which can be prolonged or shortened so as to adjust the distance between the camera body 51 and the lens assembly 50. In FIG. 8(B), it is shown that the tube 30 has two sections, which are threading engaged so that the tube 30 is telescopic by screwing the one section with respect to another one. Referring to FIG. 8(C), a compressible and expandable snake like structure is installed between two sections of the tube 30 such that the tube 30 can be prolonged or compressed to adjust the whole length of the spacer of the present invention. The adjustment of the length of the tube 30 has the advantages of adjusting the distance between the camera body 51 and lens assembly 50 so as to have a desired arrangement to be accepted by the user, and moreover, the adjustment of the length of the tube 30 will adjust the focusing of the lenses within the tube 30 so as to achieve a desirable image.

It should be noted herein that the arrangements in FIGS. 8(A) to 8(C) are suitable to be used with the lenses disclosed in FIGS. 2 to 5 and the retaining unit 8 in FIG. 6 and optical filter glass 7 in FIG. 7 are also suitable to be used within the arrangements of FIGS. 8(A) to 8(C). This can be understood by those skilled in the art and thus the detail will not be further described herein.

Figure 9A:
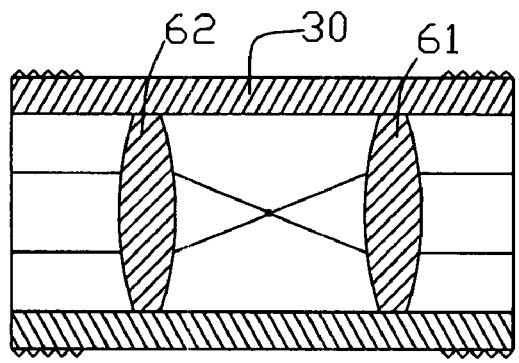
FIGS. 9(A) to 9(C) shows the second embodiment of the present invention, where the first and second lenses are convex lenses.
Figure 9B:
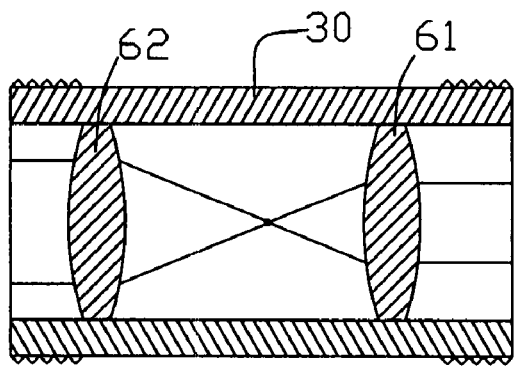
Figure 9C:
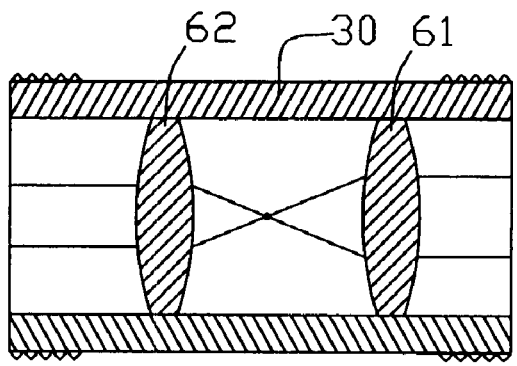

With referring to FIGS. 9(A) to 9(C), the second embodiment of the present invention is illustrated. In this embodiment, those identical to the above embodiments will not be further described herein. Only those different from above embodiment are described. In this embodiment, the first lens 61 and second lens 62 are convex lenses, which are arranged within a tube 3. The tube 3 is identical to those illustrated in FIGS. 1 to 8 and thus the details will not be further described herein. It is illustrated in the drawing that a parallel beam incident the first lens 61 will be focused to a focus point and then expands after traveling out of the focus point. Then the beam travels through the second lens 62 so as to be further focused by the second lens 62.

Figure 9D:
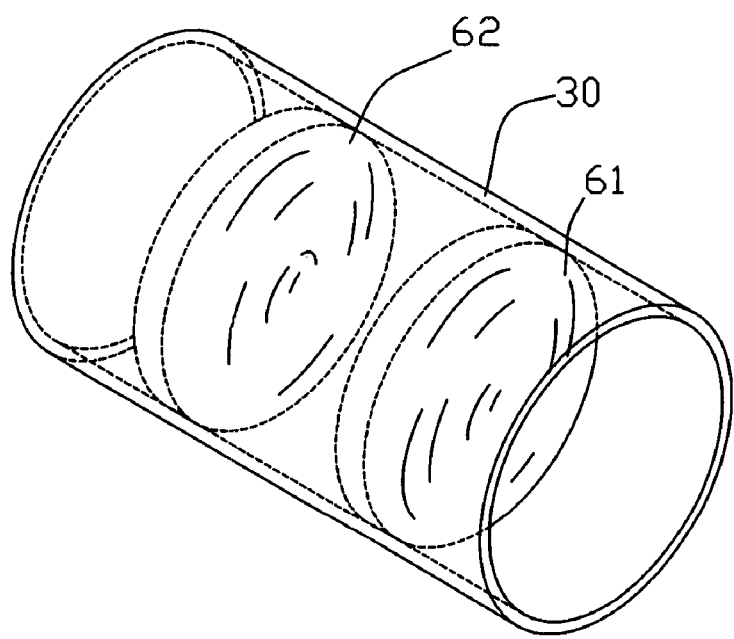
FIG. 9D is a perspective view about the spacer in FIG. 9(A).

In FIG. 9(A), the input image carried by the light beam at the light side has a coverage equal to that in the output side. A perspective view about the spacer in FIG. 9(A) is illustrated in FIG. 9(D). However, if we adjust the second lens 62 to move leftwards, as illustrated in FIG. 9(B), it is illustrated that the image is enlarged. If we move the second lens 62 rightwards, as illustrated in FIG. 9(C), it is illustrated that the image is reduced after passing through the second lens 62.

Figure 10:
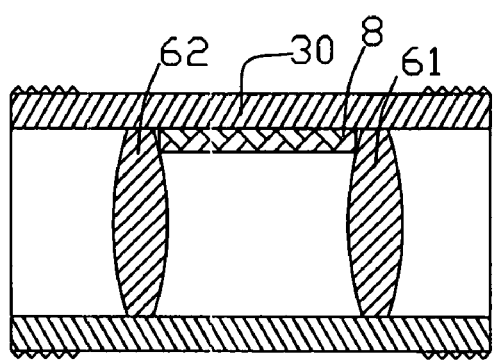
FIG. 10 shows that in one application of the present invention, wherein a retaining unit is installed in the tube and between two lenses.

Referring to FIG. 10, another application of the present invention is illustrated. It is illustrated that in the present invention, a retaining unit 8' is installed between two the first lens 61 and second lens 62 so as to retain the two lenses 61, 62 are a fixed distance. The retaining unit can be a partial or a whole round between the two lenses.

Figure 11A:
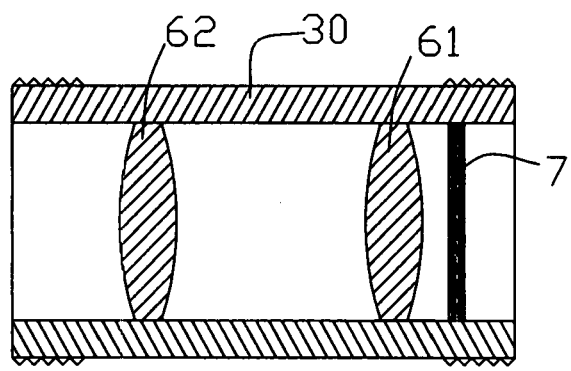
FIGS. 11(A) to 11(C) show that a optical filter glass is implemented at different positions within the tube of the present invention.
Figure 11B:
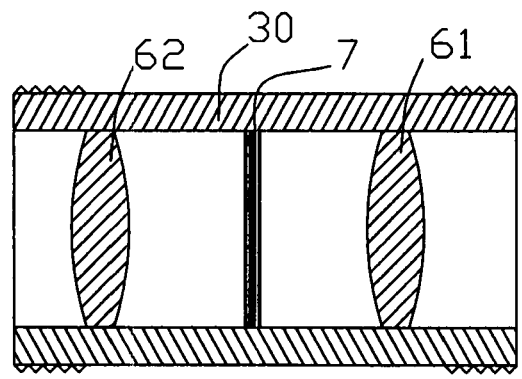
Figure 11C:
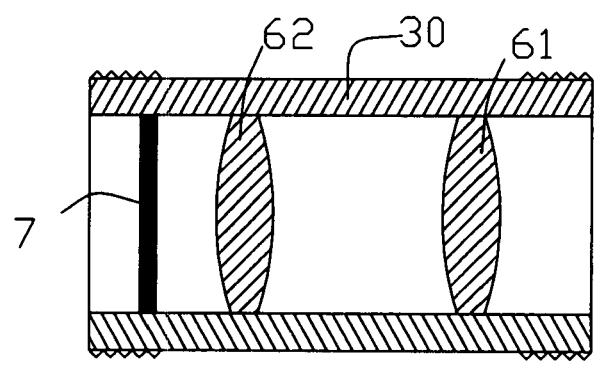

Referring to FIGS. 11(A), 11(B) and 11(C), another application of the present invention is illustrated. It is illustrated that a optical filter glass 7' is installed within the tube 30 for filtering the undesired light spectrum so as to have an image of preferred quality. However the filter 7' can be installed at different positions inside the tube. In FIG. 11(A), it is shown that the optical filter glass 7 is installed between the lens assembly and the first lens 61. In FIG. 11(B), it is illustrated that the optical filter glass 7' is installed between the first lens 61 and the second lens 62. In FIG. 11(C), it is illustrated that the optical filter glass 7' is installed behind the second lens 62.

Figure 12A:
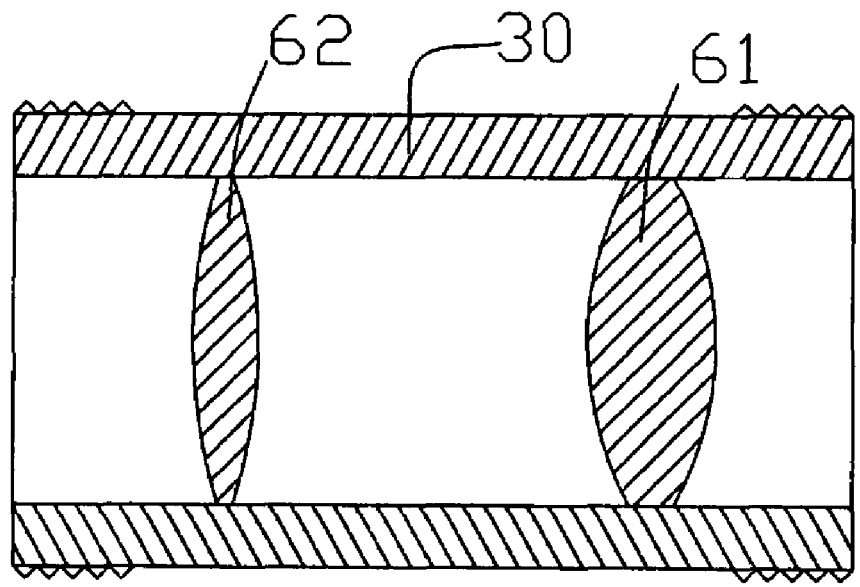
FIGS. 12(A) and 12(B) are schematic views showing some variations about the third embodiment of the present invention.
Figure 12B:
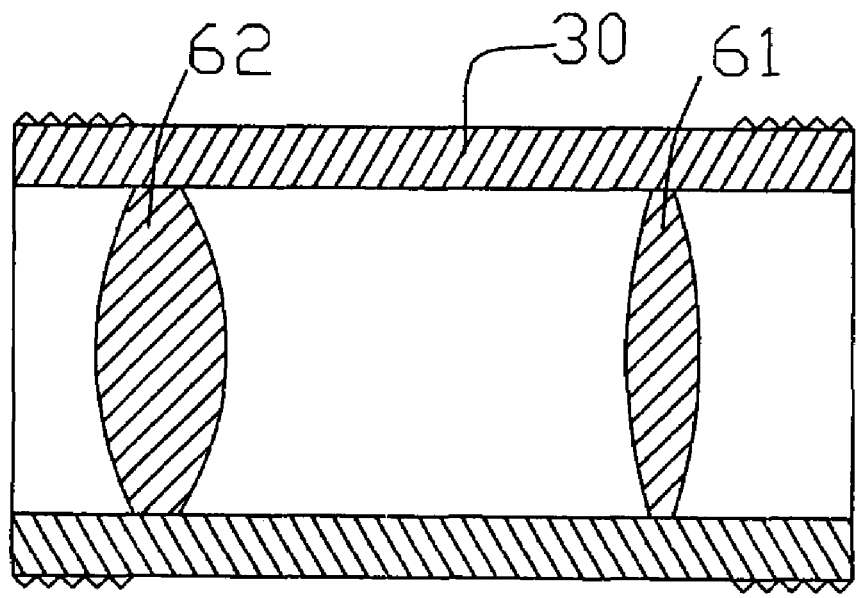

Likewise, referring to FIGS. 12(A) and 12(B), in the present invention, the two concave lenses are not limited to be symmetrical, as illustrated in the drawings, in FIG. 12(A), the two convex lenses, the first lens 61 and second lens 62 are asymmetrical. The curvature of the first lens 61 is greater than that of the second lens 62. In FIG. 12(B), the curvature of the second lens 62 is greater than that of the first lens 61.

As described in the above second embodiment, in the second embodiment, it the tube 30 is a telescopic tube. There are many different forms, which can achieve above-mentioned object. For example, the tube 30 has a plurality of sections which can be prolonged or shortened so as to adjust the distance between the camera body 51 and the lens assembly 50; or the tube 30 has two sections which are threaded engaged so that the tube 30 is telescopic by screwing the one section with respect to another one; or a compressible and expandable snake like structure is installed between two sections of the tube 30 so that the tube 30 can be prolonged or compressed to adjust the whole length of the spacer of the present invention.

While the present invention has been described in terms of what are presently considered to be the most practical and preferred embodiment. It is to be understood that the present invention need not to be limited to the disclosed embodiment. On the contrary, it is intended to cover various modifications and similar arrangements included within the spirit and scope of the appended claims that are to be accorded with the broadest interpretation so as to encompass all such modifications and similar structures.

What is claimed is:

1. A spacer for extending an image from a lens assembly of a camera, the spacer being installed between the lens assembly having at least one lens therein for capturing an image and a camera body having an image sensor for converting an image light incident into therein and then converting the light into signals; the spacer comprising:
    a hollow tube having a front engaging portion capable of being connected to the lens assembly and a rear engaging portion capable of being connected to the camera body; and
    a first lens installed in the tube; and
    a second lens installed in the tube and being spaced from the first lens; and
    wherein an axis of the first lens and an axis of the second lens are arranged approximately in parallel and are approximately vertical to an axis of the tube;
    wherein a compressible and expandable snake like structure is installed between two sections of the tube so that the tube can be prolonged or compressed to adjust a whole length of the spacer.

2. The spacer as claimed in claim 1, wherein the tube is telescopic.

3. The spacer as claimed in claim 1, wherein the tube has a plurality of sections, which can be prolonged or shortened so as to adjust the distance between the camera body and the lens assembly.

4. The spacer as claimed in claim 1, wherein the tube has at least two sections that are threaded engaged.

5. A spacer for extending an image from a lens assembly of a camera, the spacer being installed between the lens assembly having at least one lens therein for capturing an image and a camera body having an image sensor for converting an image light incident into therein and then converting the light into signals; the spacer comprising:
    a hollow tube having a front engaging portion capable of being connected to the lens assembly and a rear engaging portion capable of being connected to the camera body; and
    a first lens installed in the tube; and
    a second lens installed in the tube and being spaced from the first lens; and
    wherein an axis of the first lens and an axis of the second lens are arranged approximately in parallel and are approximately vertical to an axis of the tube;
    wherein the first lens and second lens are concave lenses which are symmetric or asymmetric; and
    wherein a optical filter glass is installed in the tube for filtering light out of a predetermined spectrum and is installed at a position selected from before the first lens, between the two lenses and after the second lens.

6. As claimed in claim 5, wherein a optical filter glass is installed in the tube for filtering light out of a predetermined spectrum and is installed at a position selected from before the first lens, between the two lenses and after the second lens.

7. The spacer as claimed in claim 6, wherein the tube is telescopic.

8. A spacer for extending an image from a lens assembly of a camera, the spacer being installed between the lens assembly having at least one lens therein for capturing an image and a camera body having an image sensor for converting an image light incident into therein and then converting the light into signals; the spacer comprising:
- a hollow tube having a front engaging portion capable of being connected to the lens assembly and a rear engaging portion capable of being connected to the camera body; and
- a first lens installed in the tube; and
- a second lens installed in the tube and being spaced from the first lens; and
- wherein an axis of the first lens and an axis of the second lens are arranged approximately in parallel and are approximately vertical to an axis of the tube;
- wherein the first lens and second lens are concave lenses which are symmetric or asymmetric; and
- wherein a retaining unit is installed between the two lenses; and
- an optical filter glass is installed in the tube for filtering light out of a predetermined spectrum and is installed at a position selected from before the first lens, between the two lenses and after the second lens.

9. The spacer as claimed in claim 8, wherein the tube is telescopic.

* * * * *